United States Patent [19]

Estopinal

[11] 4,391,789
[45] Jul. 5, 1983

[54] CARBON BLACK PROCESS

[75] Inventor: Earl J. Estopinal, Monroe, La.

[73] Assignee: Columbian Chemicals Company, Tulsa, Okla.

[21] Appl. No.: 368,534

[22] Filed: Apr. 15, 1982

[51] Int. Cl.³ .................... C01B 31/02; C09C 1/48
[52] U.S. Cl. .............................. 423/457; 423/450; 423/456; 422/150
[58] Field of Search ............... 423/449, 450, 455, 456, 423/457; 422/150; 106/307

[56] References Cited

U.S. PATENT DOCUMENTS

| | | | |
|---|---|---|---|
| 2,599,981 | 6/1952 | Eckholm | 423/455 |
| 2,851,337 | 9/1958 | Heller | 423/455 |
| 4,256,720 | 3/1981 | Kallenberger | 423/449 |
| 4,327,069 | 4/1982 | Cheng | 423/450 |

Primary Examiner—Gregory A. Heller
Attorney, Agent, or Firm—Walter M. Benjamin; George L. Rushton

[57] ABSTRACT

Disclosed is a method of making a carbon black product having a controllable aggregate particle size distribution comprising forming in a first zone of the carbon black reactor combustion gases at a high temperature and having a gradient of increasing turbulence in the downstream direction, injecting substantially radially into the first zone a carbon black feedstock into more than one of the "zones of increasing turbulence" before the gases reach maximum turbulence, cracking the feedstock to carbon black in a second (reaction) zone, quenching the carbon black reaction, and collecting the carbon black product. Also discussed is a method for making a carbon black product having varying physical characteristics as a result of modifying reaction kinetics at any position of oil injection into the "zones of turbulence".

3 Claims, 3 Drawing Figures

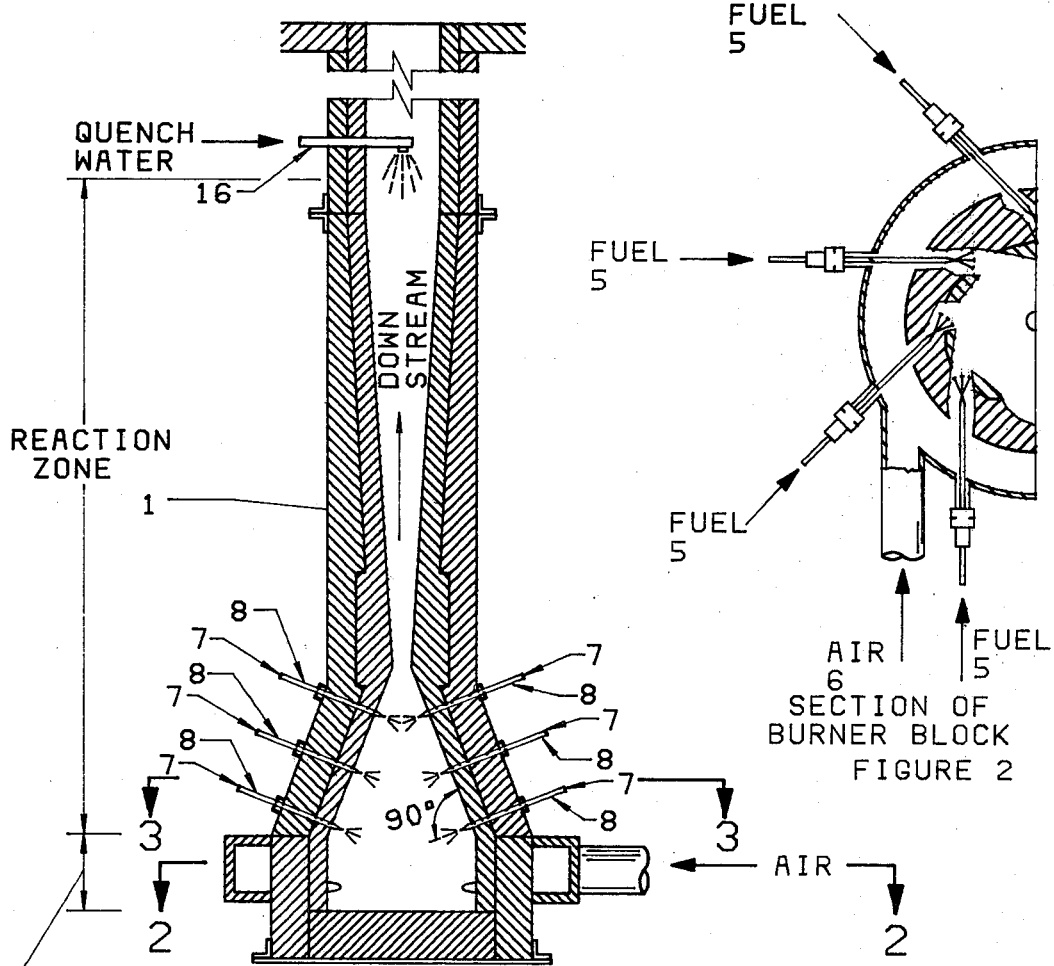
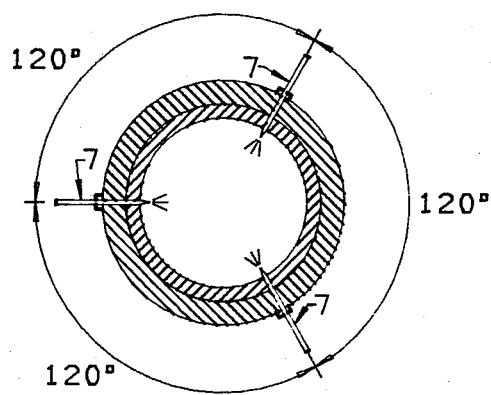
FIGURE 3

CARBON BLACK PROCESS

BACKGROUND OF THE INVENTION

This invention relates to a method of manufacturing carbon black. More particularly this invention relates to a method for achieving independent control of the aggregate particle size distribution of a carbon black. Even more particularly, this invention relates to a method whereby the energy efficiency of a carbon black reactor is optimized while, at the same time, controlling the aggregate particle size distribution of the carbon black.

A carbon black reactor is made versatile by having a "make oil" spray position adjustable axially in relation to the downstream direction in the combustion section of the reactor. That is, the make oil spray protrudes into the center of the reactor inside the combustion section, and is cooled by a water jacket or some fluid external to the process. In accordance with a typical operation, fuel and air are burned to the blast section of the reactor to produce hot combustion gases which mix well with the hydrocarbon make oil to produce carbon black.

By moving the make oil spray nozzle position axially, it is well known that the aggregate particle size of the carbon black is affected. Hence, this feature is desirable since it permits a wider variety of blacks to be produced with a given reactor geometry. However, being able to position the make oil spray nozzle along the axis of the reactor, and being able to change the location of the make oil spray nozzle relative to the reactor's "throat", requires a means of cooling the make oil spray as there are no metals able to withstand the reactor temperatures.

The cooling of the make oil spray placed feedrate limitations on the reactor because heat is removed from the reaction zone. Further, a make oil spray which is positioned along the reactor axis limits the versatility of injecting the hydrocarbon feedstock into a plurality of "zones of turbulence".

It is desirable to control the aggregate particle size distribution of the carbon black in order to impart unique performance properties to the black. For carbon blacks that are used in rubber applications, proper control of aggregate particle size distribution insures an optimum combination of rolling resistance, hysteresis, and treadwear properties in automobile tires. The aggregate particle size distribution can range from particles of an SRF type carbon black to particles of an SAF type carbon black. Alone, neither of these types of carbon blacks would have the required inherent properties to satisfy reinforcing requirements in rubber. The mean aggregate particle diameter of a narrow distribution tends to be relatively small, e.g., 10–20 millimicrons, and the mean aggregate particle diameter of a wide distribution tends to be relatively large, e.g., 50–60 millimicrons.

Unless some novel mixing procedure can be had, it is difficult, cumbersome and expensive to blend blacks of different aggregate size distributions. Ideally, these carbon blacks would have to be sized before blending. Of course, blending of several known aggregate size distributions could be done. However, developing and producing the desired blend would require several carbon black reactors and the maintenance of a complex production schedule in order to assure the correct blend. Hence, use of several reactors or blending is both uneconomical and impractical.

SUMMARY OF THE INVENTION

It has been found that the encumbrances mentioned above can be overcome by a novel carbon black reactor and method. Accordingly, feedstock is fed substantially radially into a first zone, i.e., a zone of increasing turbulence in the downstream direction, of a carbon black reactor in more than one position with respect to increasing turbulence and to the axial flow of gases downstream through the reactor. This allows for feedstock to be injected directly into the first zone of the reactor at the point(s) where an axial make oil spray would normally be positioned, without having an axial make oil spray protruding into the interior of the reactor. A plurality of these radial make oil sprays can account for a plurality of make oil spray positions. This first zone, which includes the combustion zone, is in direct communication with a second zone or reaction zone.

These sprays will be small in diameter and cause a minimum of reduction in the integrity of the refractory lining of the reactor. Further, the sprays would not require any cooling from any fluid external to the process, thereby minimizing the amount of heat energy removed from the reactor. Moreover, varying amounts of feed and additives can be injected through selective make oil spray positions in order to control the aggregate size distribution of particles in a particular size range. Other factors can be adjusted at each make oil spray position to affect carbon black properties, e.g., the make spray angle can vary, air or oxygen/oil ratio can vary, or additives can be injected in order to affect reaction kinetics.

Hence, by this method, the population density of aggregate particle sizes and physical properties in various particle size ranges can be affected, e.g., structure and surface area of aggregate particles in each of the distribution ranges can be independently affected. The extent to which variations can be made in this novel process is only left up to the imagination of one skilled in the art.

BRIEF DESCRIPTION OF THE DRAWINGS

FIG. 1 is an elevational view illustrating a carbon black reactor having a plurality of feedstock sprays positioned in accordance with the present invention.

FIG. 2 is a cross section of the burner block of the carbon black reactor in FIG. 1.

FIG. 3 is a cross section of the converging section of the reactor illustrating location of the radial "make oil" sprays.

DETAILED DESCRIPTION OF THE INVENTION

According to the present invention, a carbon black feedstock is fed substantially radially into a section of increasing high turbulence, e.g., adjacent to or co-existing with the combustion zone of a carbon black reactor, in more than one position with respect to an increasing turbulence gradient and to the axial flow of gases through the reactor.

Type of carbon black feedstock, air rate, air preheat temperatures, feedstock feedrate, and other variables, can be varied according to operations well known to those skilled in the art. The carbon black reactor design can also vary. However, in the present invention, it is preferred to have a reactor design whereby a very high turbulence of combustion gases is attainable. Further, it is desirable that injection of the feedstock be made at several points where varying degrees of high turbulence occurs. An example of such a reactor is one that has a Venturi type configuration, e.g., such as in U.S. Pat. No. 3,490,869, whereby the combustion fuels and/or gases are introduced into the reactor in such a manner to cause a spiraling motion as they proceed with increasing turbulence through the converging section of the reactor. The gases attain their highest turbulence when they reach the smallest cross sectional area of the reactor. It is conceivable that other reactor designs are feasible where there is a gradient of turbulence of the combustion gases into which the feedstock can be conveniently introduced.

According to the present invention, it is preferred that a combustion zone exists wherein a mixture of fuel, e.g., natural gas, and an excess of combustion supporting gases, e.g., air, is combusted with said combustion being initiated at the entrance to a Venturi type configuration as previously mentioned. This combustion zone is in direct communication with a reaction zone having gradients of turbulence. The make oil feedstock is injected into these zones of turbulence for reduction into carbon black and gaseous products. The carbon black and gaseous products continue their reaction through a section of maximum restriction (Venturi throat) which then emits to a chamber of an enlarged diameter.

The reaction is then quenched in that section of enlarged diameter which contains quench positions at a distance, or several distances, of predetermined resulting contact time. A quench fluid can be sprayed to substantially terminate the reaction at the predetermined contact time. Carbon black produced is separated from the reaction gases in a collection apparatus and is processed by methods well known in the art.

In the operation of the present invention, it is preferred that the fuel and supporting gas is tangentially introduced in the combustion zone. This manner of introduction facilitates the control of the reactor gaseous flow patterns. Reactor turbulence intensifies and becomes extreme when used in conjunction with a Venturi combustion zone. Accordingly, an axial turbulent gradient is created of increasing intensity in the downstream direction. It is preferred that this Venturi terminates into an opening ranging from about 5 inches to 12 inches in diameter.

According to the present invention, the feedstock is injected radially into the first zone of the reactor at a plurality of "zones of increasing turbulence". At each "zone of turbulence", there are, preferably a plurality of injection points. Though it is possible to inject the feedstock into the "zone of turbulence" through one injection point, it is preferable to use from two to four peripherally located points. The feedstock is preferably introduced so as to be perpendicular to the convergence angle of a Venturi type reactor, intersecting the reactor axis, and at sufficient pressure so as to enable the feedstock droplet momentum to penetrate the combustion gas layer which exists at the injection location. Feedstock pressure should not be so great as to permit oil droplets to penetrate the combustion gas layer against the opposite wall and strike the opposite wall of the reactor.

It is conceived that injecting feedstock into a plurality of "zones of turbulence" will result in a controllable aggregate particle size distribution range, whereby the closer the injections are to the higher turbulence zones, the smaller the aggregate particle size. This is a direct result of varying reaction kinetics at each "zone of turbulence" which is a function of contact time, temperature, and feedstock concentration.

The individual feedstock sprays, at these various points, are small in diameter, e.g., ¼ inch diameter, thus minimizing the risk of damaging the integrity of the reactor refractory lining. These sprays may be placed around the combustion zone of the reactor in several circumferential ring patterns or otherwise such as a helical or spiral pattern. They should be positioned perpendicular to the plane of the reactor convergence angle and intersecting the reactor axis.

The make oil sprays are designed so that materials such as oxygen or oxygen enriched air may be injected along with the feedstock into several positions, e.g., in the higher turbulence zone where the aggregate particle size of the carbon black produced is small and with low structure. This oxygen has the tendency to increase structure. At the positions of lower turbulence, where structure of the carbon black produced is higher, a structure control additive, e.g., an alkaline metal salt, may be injected. Different quantities of feedstock can be injected into these various positions to affect the quantity of carbon black produced in a particular aggregate particle size distribution from the various positions. The type of spray at each injection point may differ to affect the aggregate size of the carbon black aggregate particle produced from that particular injection point.

These injection sprays require little or no cooling as they need not protrude into the interior of the reactor. The tangentially injected air for fuel suppoert may offer some cooling of these sprays, but the present invention is not designed to rely on this cooling. The flow of feedstock through the spray will be sufficient to keep it cool.

Whenever a type of carbon black is produced where no feedstock will be injected into certain available positions, the spray can be protected from the extreme heat of the reactor by retraction into the protection of the reactor refractory wall, or by cooling with a relatively inert fluid. This fluid may also be purposely designed to affect the reaction kinetics as well.

Coking of the feedstock is avoided by injecting the feedstock perpendicular to the convergence angle of the reactor and intersecting the axis of the reactor. Feedstock injection pressure is controlled so as to avoid striking the opposite inner wall of the reactor. Sprays may be directed so that the stream of oil from the same circumferential ring oppose each other rather than striking the inside of the opposite wall of the reactor.

It can be readily seen that there is great diversity in the present invention. Many variations could be made to control the aggregate particle size distribution as well as to control the physical properties of certain portions of the resulting product. Hence, the description of the present embodiment is not intended to limit the scope of this invention, the scope is intended to be limited only insofar as there are limitations in the claims.

This invention may be better understood by the following example.

EXAMPLE

Reference is made to FIG. 1 which shows a reactor 1 in accordance with the present invention. Air 6 (see also FIG. 2) is injected tangentially into Venturi combustion zone (2) along with fuel (natural gas) (5) which after ignition creates a vortex of hot spiraling combustion gases of increasing turbulence as it proceeds downstream to the "throat" of the reactor. Feed (make oil) (7) is fed equally through ¼ inch diameter sprays (8) and (9). A reaction catalyst is fed into spray (8) while oxygen is fed into spray (9). The cracking of the carbon black feedstock (7) is then terminated (quenched) by water (11) through spray (10) to cool the effluent to below reaction temperature, around 1800° F.

The feedstock feed rate is able to be increased approximately 10% with the additional energy that would otherwise have been removed from the reactor if an adjustable (axial) water jacketed feed spray of prior art were to be used. The carbon yield is thereby increased 3–5%. A carbon black product having a wide particle size distribution is further produced. The carbon black imparts improved rolling resistance, treadware and hystersis properties to tire tread compounds.

What is claimed is:

1. A method of making a carbon black product comprising:

forming, in a first zone of a Venturi type carbon black reactor wherein the first zone is the converging section of the Venturi type carbon black reactor, combustion gases at a high temperature having a gradient of increasing turbulence in an axial downstream direction, said turbulence resulting from the tangential injection of a fuel and a combustion-supporting gas injecting, substantially radially into the first zone of the reactor, a carbon black feedstock at more than one of the axial gradient positions before the combustion gases reach maximum turbulence, cracking the carbon black feedstock into carbon black, quenching the carbon black reaction in a second zone after said gases have reached maximum turbulence, and collecting the carbon black product said product having a controlled particle size distribution.

2. The method of claim 1, wherein an alkaline metal salt is injected into selected feedstock injection positions.

3. The method of claim 1, wherein oxygen or an oxygen enriched gas is injected into selected feedstock injection positions.

* * * * *